United States Patent [19]
Hergenhan

[11] 4,290,101
[45] Sep. 15, 1981

[54] N PHASE DIGITAL INVERTER
[75] Inventor: Odo Hergenhan, Hightstown, N.J.
[73] Assignee: Burroughs Corporation, Detroit, Mich.
[21] Appl. No.: 109,128
[22] Filed: Dec. 31, 1979

Related U.S. Application Data
[63] Continuation of Ser. No. 865,403, Dec. 29, 1977, abandoned.

[51] Int. Cl.[3] .......................................... H02M 3/22
[52] U.S. Cl. ........................................ 363/65; 363/21
[58] Field of Search ...................... 363/20, 21, 65, 71, 363/72, 101; 323/23, DIG. 1

[56] References Cited
U.S. PATENT DOCUMENTS

| | | | |
|---|---|---|---|
| 3,978,393 | 8/1976 | Wisner et al. | 323/23 X |
| 3,984,799 | 10/1976 | Fletcher et al. | 363/21 |
| 4,020,408 | 4/1977 | Grant | 363/21 |
| 4,031,453 | 6/1977 | Teuling | 363/20 |
| 4,062,057 | 12/1977 | Perkins et al. | 363/71 |
| 4,063,307 | 12/1977 | Stephens | 363/21 |
| 4,195,333 | 3/1980 | Hedel | 363/65 |

*Primary Examiner*—William M. Shoop
*Attorney, Agent, or Firm*—Leonard C. Brenner; K. R. Peterson; E. M. Chung

[57] ABSTRACT

An N phase digital inverter for converting an input DC voltage level to an output DC voltage level interposes between the input and output terminals thereof a plurality of N parallel switching circuits, each switching circuit thereof comprising in series a power switch and a transformer. The output of each transformer is coupled through a diode to a common point for filtering to generate the output DC voltage. The output DC voltage is sensed and fed to a logic generator for generating a ring sequence of pulses which activate sequentially each power switch in the plurality thereof. The logic generator controls the ratio of pulse time ON divided by pulse time ON plus pulse time OFF to maintain a desired level of output DC voltage.

10 Claims, 4 Drawing Figures

N PHASE DIGITAL INVERTER

This is a continuation, of application Ser. No. 865,403, now abandoned filed Dec. 29, 1977.

BACKGROUND OF THE INVENTION

The present N phase digital inverter invention relates to the field of DC-to-DC voltage level conversion. More particularly, the present invention relates to DC-to-DC converters utilizing pulse width modulation.

In prior art DC-to-DC converters, a DC voltage is commonly switched through a transistor or a pair thereof and fed to a transformer thereafter to be rectified and filtered to provide a DC output voltage. For large currents, heavy duty switching transistors, transformers, and rectifiers must be employed.

It is therefore an object of the present invention to provide a DC-to-DC converter employing a plurality of relatively low current handling devices operating on a time division multiplex basis to provide a total relatively high current handling capability.

It is another object of the present invention to provide a modular DC-to-DC converter architecture using ring sequencing activation of N parallel switching circuits, transformers, and rectifiers wherein the number N is selectable according to component cost/size and other justification parameters relating to a particular application.

SUMMARY OF THE INVENTION

The above and other objects and features of the invention are realized through an N digital inverter for converting an input DC voltage level to an output DC voltage level, the digital inverter having a plurality of N power switches fed in parallel by the input DC voltage level. Each switch feeds through an individually associated transformer to a rectifier. Current flows through the rectifiers to a common point for filtering to generate the output DC voltage level. The output DC voltage level is fed back to a logic generator which develops a ring sequence of control activating pulses for the N parallel power switches and controls the ON time ratio of the pulses to maintain a desired level of output voltage.

DESCRIPTION OF THE DRAWINGS

The above-mentioned and other objects, advantages and features of the present invention will become more readily apparent from a review of the following specification when taken together with the drawings wherein.

DETAILED DESCRIPTION OF THE INVENTION

Figure 1:
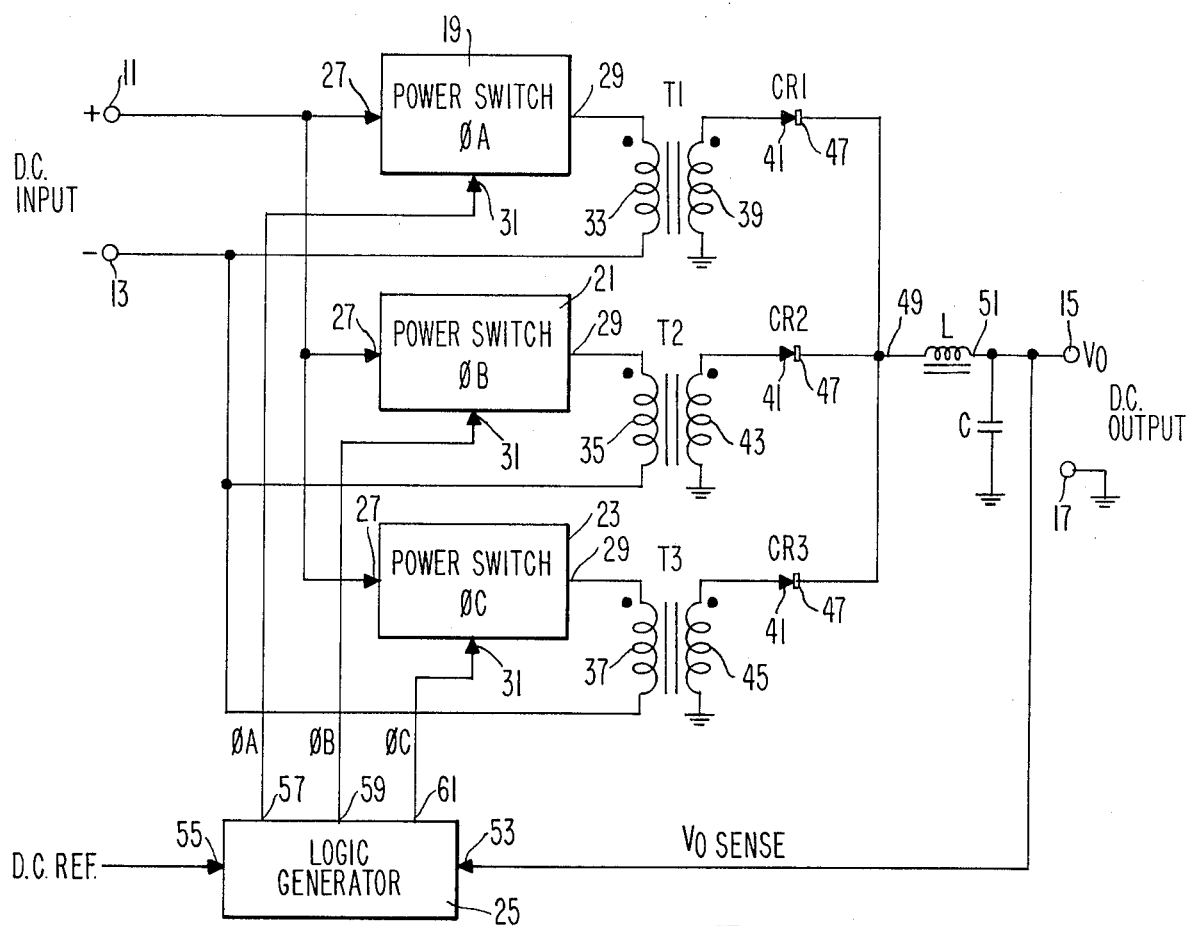
FIG. 1 is a logic diagram of the N-phase digital inverter.

With reference to FIG. 1, the digital inverter of the present invention includes a positive input terminal 11 and a negative input terminal 13 for receiving a DC voltage input and a positive output terminal 15 and a negative output terminal 17 for outputting a DC voltage. The negative output terminal 17 may be grounded. Therebetween, three power switches 19, 21 and 23 sequentially generate pulses which are fed respectively to three transformers T1, T2 and T3 whose outputs are combined to generate a DC output voltage at output terminal 15. The output voltage at terminal 15 is fed back to a three-phase logic generator 25 which controls the three power switches 19, 21 and 23 in a manner hereinafter to be described.

Each power switch 19, 21 and 23, includes an input terminal 27, an output terminal 29 and a control terminal 31 for controlling the current flow between the input terminal 27 and the output terminal 29. Current flows from the output terminal 29 of power switch 19 through the primary winding 33 of transformer T1 and back to the negative input terminal 13. In like fashion, power flows through power switch 21, through the primary winding 35 of transformer T2 and back to the negative input terminal 13. Power also flows through power switch 23 through the primary winding 37 of transformer T3 and back to the negative input 13. One end of the secondary winding 39 of transformer T1 is grounded while the other end feeds an anode 41 of diode CR1. Likewise, the secondary windings 43 and 45 of transformers T2 and T3 are connected between ground and the anode 41 of diodes CR2 and CR3 respectively. The cathodes 47 of CR1, CR2 and CR3 are joined together and fed to a first end 49 of an inductor L whose second end 51 is connected to ground filter capacitor C and to the output terminal 15. The inductor L and capacitor C interact to filter the voltage between inductor end 49 and the voltage output terminal 15. The voltage appearing at output terminal 15 is fed back to an input terminal 53 on the three-phase logic generator 25. The three-phase logic generator 25 also has a DC reference input 55 against which the output voltage appearing on terminal 15 is compared to generate the controlling pulses for the power switches 19, 21 and 23 in a manner described herebelow. The three-phase logic generator 25 has three outputs 57, 59 and 61 for providing control pulses to the control inputs 31 of the power switches 19, 21 and 23 respectively.

Figure 2:
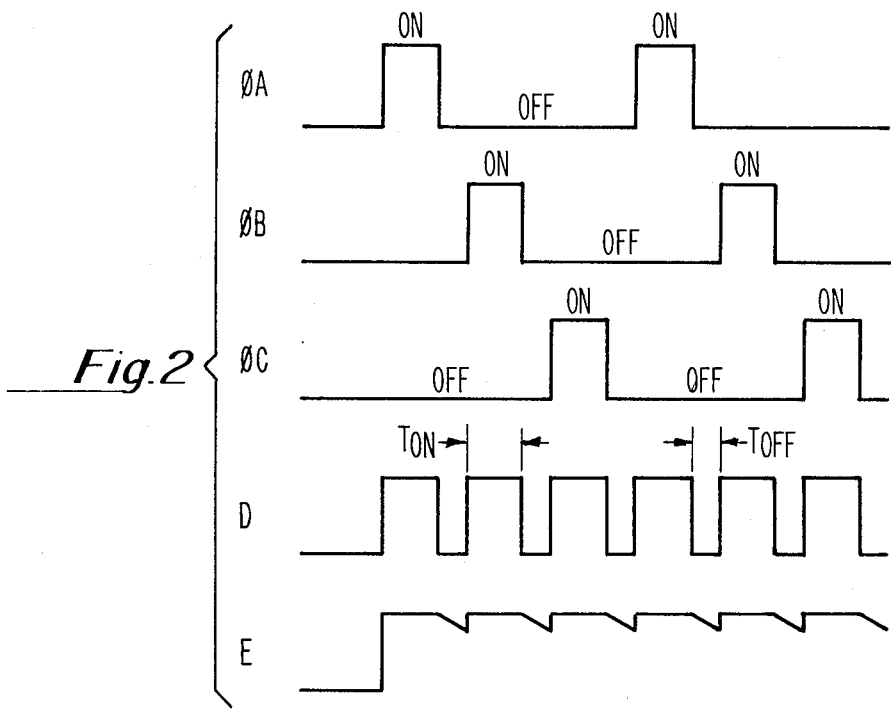
FIG. 2 is a timing diagram illustrating waveform patterns generated by the digital inverter of FIG. 1.

With reference now to FIG. 2, it may be seen that the controlling pulses generated on phase A, phase B and phase C are generated sequentially and combined to form waveshape form D. Waveshape form D is representative of the waveform appearing at the inductor L input 49 which is the cathode junction of the diodes CR1, CR2 and CR3, see again FIG. 1. The inductor L combined with capacitor C filters the waveform D into waveform E which represents the waveform at the voltage output terminal 15. The average voltage value on output voltage terminal 15 is proportional to the time ON divided by the sum of the time ON plus the time OFF period of waveform D. Thus, by varying the time ON duration of the controlling pulses phase A, phase B, and phase C appearing on lines 57, 59, and 61 respectively, the output voltage V0 may be controlled. It is the function of the three-phase logic generator 25 to control for waveform D the ration T ON divided by the quantity T ON+T OFF. Thus, the three-phase logic generator 25 functions to hold the output voltage V0 appearing on output terminal 15 constant.

Figure 3:
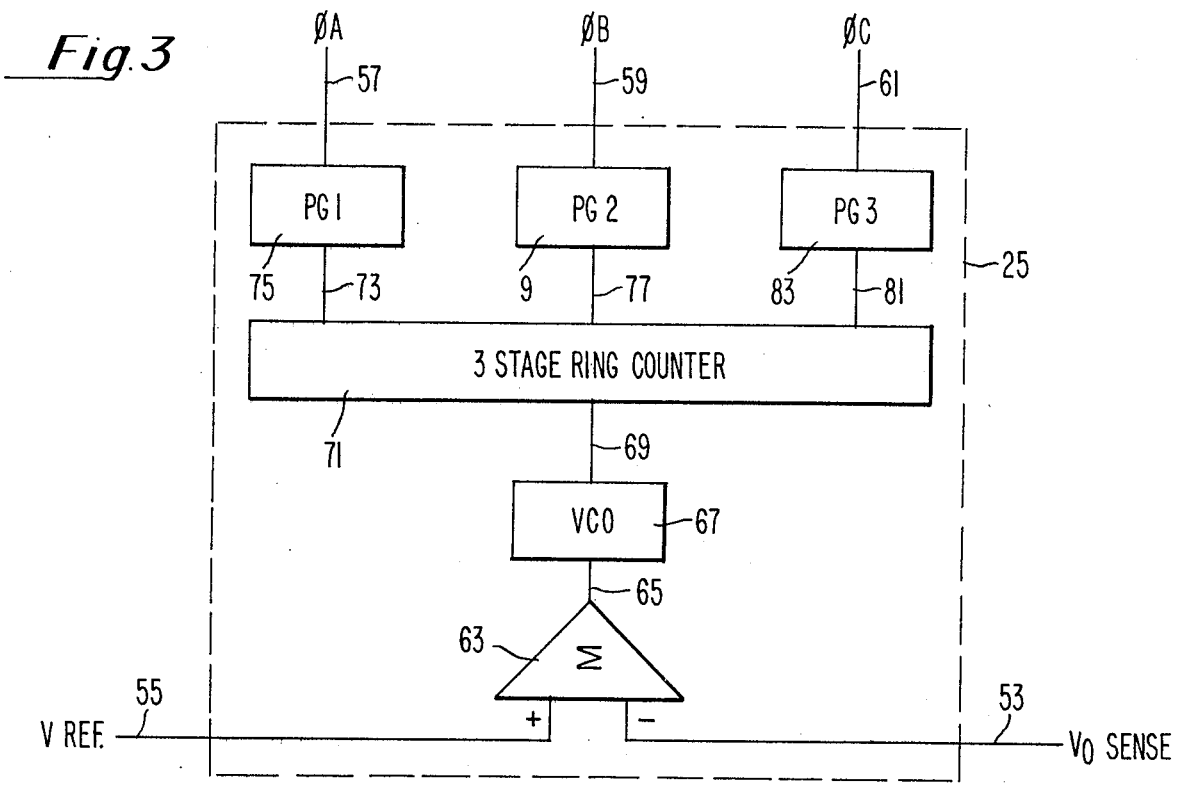
FIG. 3 is a first embodiment of a logic generator used in the digital inverter of FIG. 1.

The three-phase logic generator 25 may be embodied as shown in FIG. 3. The output voltage on output terminal 15 is fed to an output voltage sensing terminal 53 and compared to the desired voltage reference on terminal 55 by the comparator 63. Comparator 63 generates an error or difference voltage at its output terminal 65.

The error voltage is used to control the frequency of a voltage controlled oscillator 67 having in its preferred embodiment a nominal frequency in the order of ten to twenty kilohertz. The voltage control oscillator 67 has an output 69 which is connected to a three-stage ring counter 71. The function of the three-stage ring counter 71 is to produce sequentially the pulses shown on FIG. 2 as phase A, phase B, and phase C. The three-phase ring counter 71 has a first output 73 feeding a pulse generator 75 which generates the fixed duration pulse and transmits the same on line 57 as pulse phase A. In like manner, the second output line 77 of three-stage ring counter 71 drives a fixed duration pulse generator 79 which generates pulse phase B on line 59. Finally, the third output 81 of the three-stage ring counter 71 triggers a fix duration pulse generator 83 which generates phase C pulses on line 61. Since the duration of the pulses produced by pulse generators 75, 79 and 83 are constant while the output 69 of the voltage control oscillator 67 varies in frequency in accord with the difference voltage appearing on line 65, the ratio T ON divided by the quantity T ON+T OFF (see FIG. 2), is controlled by the error voltage 65 hence functioning to hold constant the output voltage appearing on output voltage terminal 15.

Figure 4:
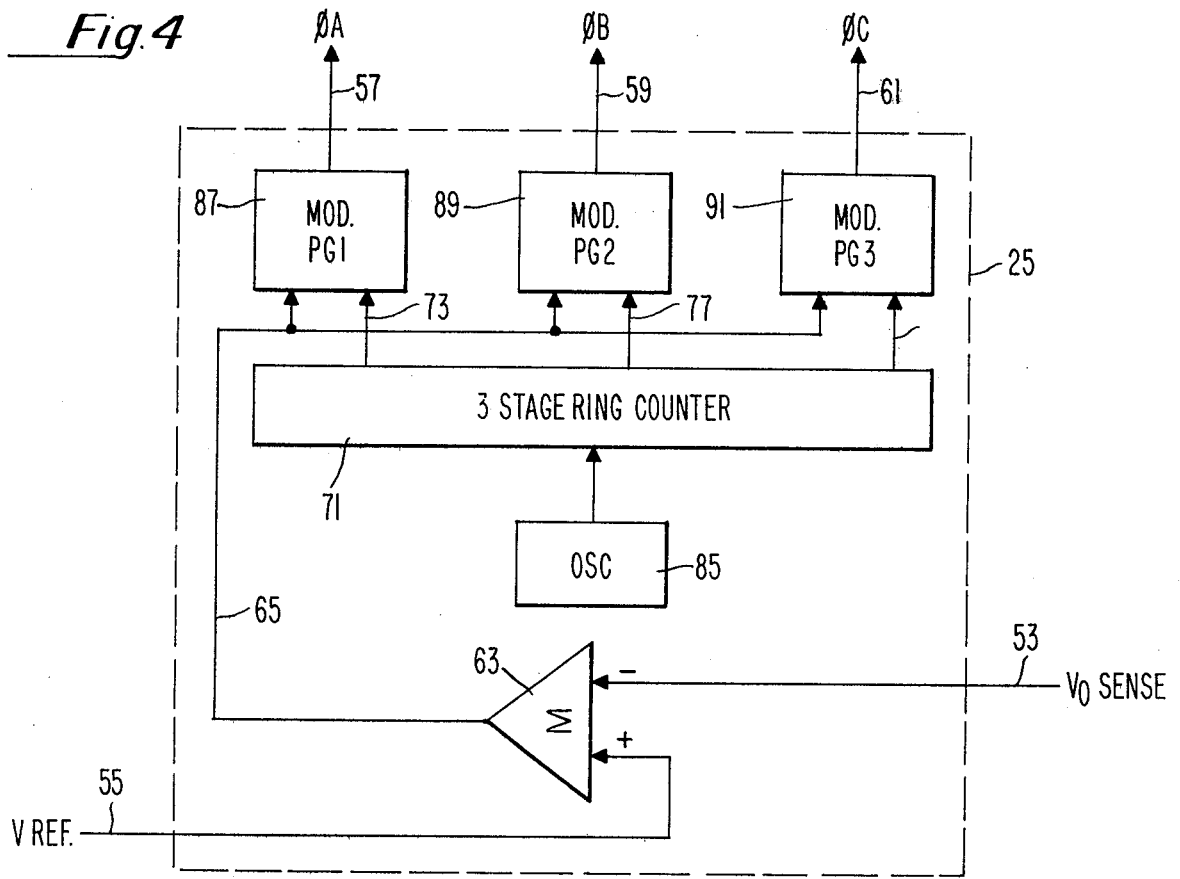
FIG. 4 is a second embodiment of the logic generator used in the digital inverter of FIG. 1.

In an alternate embodiment, see FIG. 4, a fixed frequency oscillator 85 in the order of ten to twenty kilohertz feeds directly the three-stage ring counter 71 which generates sequential signals on lines 73, 77 and 81 to trigger pulses generated by pulse width modulators 87, 89 and 91 respectively. The width of the pulses generated by pulse width modulators 87, 89 and 91 is controlled by the error voltage 65 generated by comparing the output voltage on terminal 15 with the desired voltage reference appearing on terminal 55. Thus, with reference again to FIG. 2, It can be seen that by modulating pulse widths of phase A, phase B, phase C, the ratio of T ON divided by the quantity T ON+T OFF can be controlled by the signal on line 65. Hence, the voltage output appearing on output terminal 15 shown in FIG. 1 is maintained constant at the desired voltage reference level.

There has been described above a specific embodiment of a digital inverter of the present invention and two specific embodiments of a logic generator used therein. It is understood that variations and modifications can be made within the scope of the invention for other applications and purposes. For example, the number of power switches 19, 21 and 23 may be decreased to two or increased to any number N. By increasing the number of power switches each transformer associated therewith carries proportionally a smaller percent of the total output current and hence may be fabricated with smaller windings and other parts. The number of signals generated by the logic generator of course is increased as the number of power switches increase merely by changing the shown three-stage counter into an N-stage counter wherein N is equal to the number of power switches. Furthermore, as known by those skilled in the art, various other embodiments could be fabricated for the logic generator 25, so long as the logic generator generates controlling pulses sequentially for the power switches and controls the total time ON period of the switches with respect to the total time ON+time OFF period of the switches so as to regulate the output voltage appearing on terminal 15. Likewise, although disclosed as a DC-to-DC digital inverter, the inverter may be used to convert AC to DC by first rectifying the AC voltage be it single phase, or multiphase. The ratio of the output voltage appearing on terminal 15 with respect to the input voltage appearing between terminals 11 and 13 may be, of course, controlled by the turns ratio of the transformers T1, T2 and T3.

While the invention has been described mainly in relation to a presently preferred embodiment thereof, those skilled in the art will recognize that many variations and arrangement and placement of parts may be made to suit varying requirements in the scope of the present invention.

What is claimed is:

1. A single feedback loop N-phase digital inverter for converting a first DC level into a second DC level comprising:
   a first and a second input terminal for receiving therebetween said first DC level;
   a first and second output terminal for outputting therebetween said second DC level;
   a plurality of switching means for passing and inhibiting current flow, each switching means therein having an input lead connected to said first input terminal, an output lead, and a control terminal for receiving pulses to control the passing and inhibiting of current flow between said input lead and said output lead;
   a plurality of transformers, each transformer therein having a primary winding with one end thereof connected to said output lead of an individually associated switching means in said plurality thereof and the other end connected to said second input terminal, each transformer also having a secondary winding with a first and a second end thereof, said second end being connected to said second output terminal;
   a plurality of rectifiers, each rectifier having a first rectifier end connected to said first end of said secondary winding of an individually associated transformer in said plurality thereof, and a second rectifier end joined together with all other said second rectifier ends;
   filtering means connected between said joined second ends of said rectifiers and said first output terminal for providing voltage filtering therebetween;
   a single feedback path having a first and a second end, said first end thereof connected to said first output terminal; and
   logic generator means connected to said second end of said single feedback path, said logic generator means providing pulses sequentially to said control terminal of each switching means in said plurality thereof for maintaining said second DC level at a constant value.

2. The N-phase digital inverter according to claim 1 wherein:
   said logic generator means includes means for modulating said provided pulses ON time.

3. The N-phase digital inverter according to claim 1 wherein:
   said logic generator means includes means for modulating said provided pulses OFF time.

4. The single feedback loop N-phase digital inverter according to claim 3 wherein said means for modulating includes a voltage controlled oscillator for generating a variable pulse cycle rate.

5. The single feedback loop N-phase digital inverter according to claim 1 wherein said logic generator means provides pulses at a rate substantially within the range of 10 to 20 kilopulses per second.

6. The N-phase digital inverter according to claim 1 wherein N is equal to 3.

7. The N-phase digital inverter according to claim 1 wherein each transformer in said plurality thereof is a step-down transformer.

8. The N-phase digital inverter according to claim 1 wherein said second output terminal is grounded.

9. The single feedback loop N-phase digital inverter according to claim 1 wherein said single feedback path comprises a directly wired connection between said first output terminal and said logic generator means for providing directly to said logic generator means said second DC level.

10. The single feedback loop N-phase digital inverter according to claim 9 wherein said logic generator means includes a two input comparator for comparing said second DC level with a single DC reference voltage level.

* * * * *